Jan. 12, 1937.　　　　　V. L. LETT　　　　　2,067,639

RADIATOR PROTECTOR

Filed March 25, 1935

Inventor
Virgil L. Lett
Homer J. Sweet.

By

Attorney

Patented Jan. 12, 1937

2,067,639

UNITED STATES PATENT OFFICE 2,067,639

RADIATOR PROTECTOR

Virgil L. Lett, Denver, Colo.

Application March 25, 1935, Serial No. 12,887

4 Claims. (Cl. 257—132)

This invention relates to protective devices for automobile radiators, and has as an object to provide an improved such device in accessory form that may be readily mounted on and removed from conventional automobile radiators.

A further object of the invention is to provide an improved radiator protector arranged for mounting on and removal from conventional automobile constructions without the use of tools and without alteration of the vehicle elements.

A further object of the invention is to provide an improved radiator protector combining all-season advantages when cooperatively employed with conventional automobile radiator constructions.

A further object of the invention is to provide an improved radiator protector assembly arranged for removable cooperation with conventional automobile radiator constructions and designed to form, if desired, a permanent attachment for the automobile which in nowise detracts from the appearance and efficiency of the vehicle.

A further object of the invention is to provide an improved radiator protector assembly that is simple and inexpensive of manufacture and installation, efficient to the ends sought, readily adjustable to specific needs and uses, readily removable and replaceable, and long-lived in use.

My invention consists in the construction, arrangement and combination of elements hereinafter set forth, pointed out in my claims and illustrated by the accompanying drawing, in which—

Figure 1:
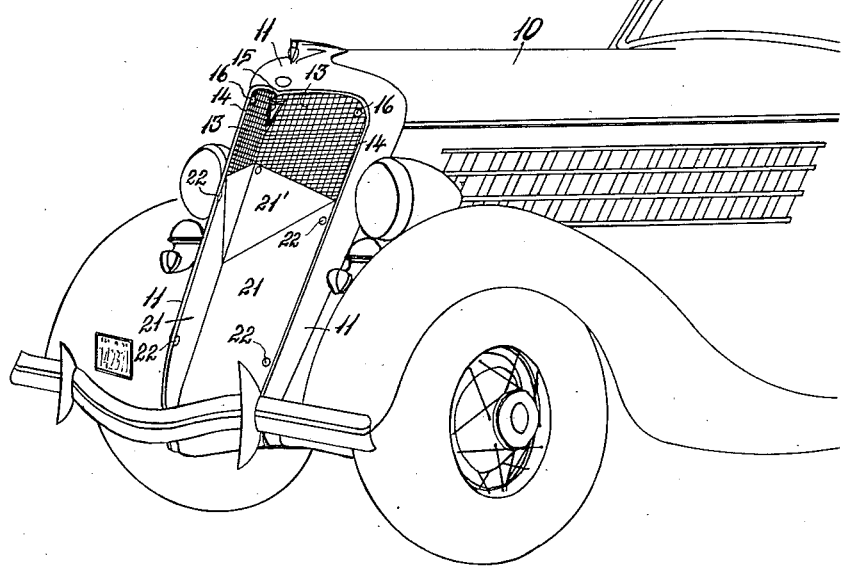
Figure 2:
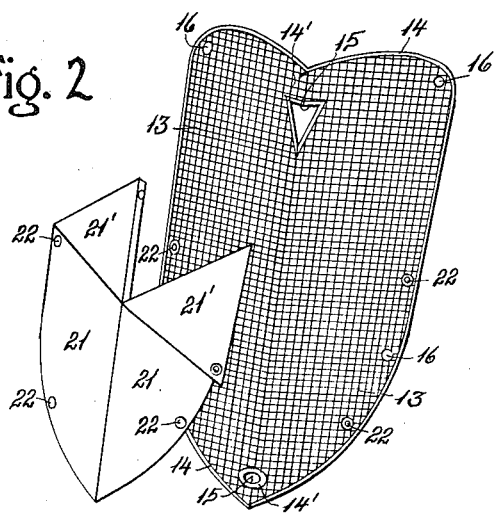
Figure 3:
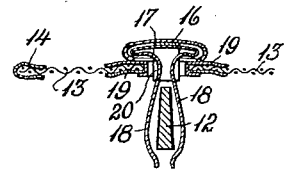
Figure 4:
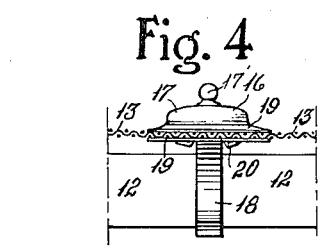

Figure 1 is a perspective view of the front end of an automobile showing the improved protector assembly in place for practical use. Figure 2 is a perspective view, on an enlarged scale, of the cooperating elements of the improved protector assembly prior to mounting thereof on a vehicle. Figure 3 is a fragmentary, detail section, on an enlarged scale, through one of the attaching elements employed as an element of the improvement. Figure 4 is a fragmentary, detail view, partly in section, similar to and on the same scale as Figure 3, illustrating a modified form of attaching element adapted for employment with the other elements of the improvement.

With all-year operation of modern, high-speed automobiles carrying conventional cooling radiators on their forward ends, two separate conditions requiring radiator protection are encountered. During the milder seasons, and particularly in certain sections of the country, various forms of insect life, such as grasshoppers, beetles, and the like, abound, with the result that automobiles driven through such areas collect such insects in the interstices of their radiators, plugging the latter and reducing the cooling efficiency of the radiator when it is most needed, with obvious disadvantageous results. On the other hand, the usual cold weather problem of maintaining the radiator contents at temperatures conducive to efficient engine operation is ever recurrent when the colder seasons approach and needs to be considered even when the radiator contents are non-freezing in character. The instant invention has been designed and arranged to provide facile means for protecting the radiator with a single, adaptable installation against both conditions above set forth.

In the construction of the improvement as shown, the numeral 10 designates the forward portion of a conventional automobile equipped with the conventional radiator carried on the front end of the vehicle within a usual housing indicated at 11. The specific radiator and housing construction varies widely in practice, which is largely immaterial insofar as the instant invention is concerned, but, in late model automobiles, such construction commonly includes a grid of spaced bars carried by the housing 11 forwardly of and in spaced relation with the forward side of the radiator proper, such construction being so usual and well-known as to need no specific illustration other than the representation of a grid bar, designated by the numeral 12, in Figures 3 and 4.

The basic element of the improved protector is a sheet of reticulated or foraminous material, shown at 13 in the drawing, which sheet is outlined in size and shape to conform with the radiator opening of the housing 11 and marginally finished with a narrow binding or finish strip 14, preferably of flexible material such as leather, or the like, stitched or otherwise permanently secured about the sheet 13. Such openings 15 as may be required to register with openings or devices carried by the radiator and its housing are formed in and through the sheet 13 to adapt the latter for mounting on a specific make of vehicle, said openings 15 being marginally finished with permanent bindings 14' corresponding with the sheet binding 14. The sheet 13, prepared as above described, is adapted to fill the radiator opening of the housing 11 and lie smoothly against the grid bars 12 of said housing, or against the forward face of the radiator, and arrest insects, weeds, and like foreign matter, impinging against the forward end of the vehicle, thereby protecting the radiator against penetration of such matter within its interstices. To position and secure the sheet 13 in the desired relation with the radiator housing 11, a plurality of clip buttons 16 is disposed in spaced relation marginally about said sheet for clamping cooperation with the grid bars 12 or other permanent elements of the radiator assembly. The buttons 16 may be of any specific construction suitable to their purpose, and are shown as comprising a suitable head portion 17 secured to and supporting a pair of spring fingers 18 extending in opposition axially from said portion 17, which fingers 18 are arranged to receive and clip over selected bars 12, as is clearly shown in Figures 3 and 4. The head portion 17 of a button 16 may of course be arranged for direct connection with the sheet 13, whereby a given button is suitably positioned with respect to said sheet, or, as illustrated, a suitable, two-piece, interlocking collar or ferrule 19 may be fixed to the sheet 13 in the desired position to provide an aperture wherein the assembly 17, 18 is received, spring fingers 20 carried by the head portion 17 engaging under the ferrule or collar 19 to removably hold the clip button in the relation shown. With the clip buttons 16 suitably positioned and disposed marginally of the sheet 13, said sheet may be mounted and secured in cooperating relation with the radiator housing and radiator by manual pressure applied successively to the said buttons to press them into embracing relation of their fingers 18 about selected bars 12, or suitable equivalents, and removal of said sheet 13 from its mounted position is readily effected by simply pulling the clip buttons 16 away from such engagement.

The invention thus far described presents a complete and convenient protection for the radiator during periods of mild temperatures and interferes in no way with the normal, efficient operation of the vehicle. The sheet 13 is ornamental in appearance and, if desired, is susceptible of decoration or may carry suitable advertising matter applied in contrasting colors directly thereto.

Supplementing the protector above described and providing cold weather protection, a sheet 21 of imperforate material is suitably prepared to conform in outline with and closely overlie the lower portion of the sheet 13, so that, when the said sheet 21 is mounted in its supplemental relation with said sheet 13, as shown in Figure 1, air flow through a portion of the radiator is cut off and the cooling effect of said radiator thereby reduced, as is common practice. To removably position and support the sheet 21 on and relative to the sheet 13, a plurality of two-part, separable snap-buttons or fasteners are employed, which fasteners, indicated at 22, are common and well-known and are arranged with one half of each secured to each of the sheets 13 and 21, so that, when the fastener halves are engaged, the sheet 21 is arranged to register marginally and in covering relation with the lower portion of the sheet 13, the separable fasteners being disposed marginally of the sheet 21 and providing ready means for the removal and replacement of said sheet 21 relative to the sheet 13. As shown in Figure 4, the head portion of certain of the clip buttons 16 may be formed as one half of a fastener 22, in which case portions of the separable fasteners 22 need not be secured separately to the sheet 13, the complementary portions of said fasteners, only, being disposed marginally of the sheet 21 to register and cooperate with the knobs 17' of the proper clip buttons 16.

As is clearly shown in Figure 2, an upper portion of the sheet 21 may be divided and provided with flexible lines to form adjustable flaps 21' which may be folded and secured in either of two positions to permit variation in the area covered by said sheet.

It will be obvious that the improvement shown and above described presents a complete all-weather protector for automobile radiators that can be made in a few stock sizes for ready mounting on the majority of modern vehicles to adequately and efficiently protect such radiators in a manner to enhance their efficiency. The sheet 13, if it becomes obstructed, can be easily removed, cleaned and replaced.

Since many changes in the specific form, construction and arrangement of the elements shown and described may be had, and may indeed be necessary in adapting the improvement to specific makes of vehicles, I wish to be understood as being limited solely by the scope of the appended claims, rather than by any details of the illustrative showing and foregoing description.

I claim as my invention—

1. As an article of manufacture, a flexible radiator protector assembly adapted for removable association in overlying conforming relation with the grid of a radiator, said assembly comprising a pliant, normally flat sheet of foraminous material having small perforations and adapted to be bent to conform to the frontal contour of a radiator grid, a flexible binding for margins of said sheet, a plurality of fasteners carried by said sheet and projecting from the rear face thereof for engagement with elements of a radiator grid to hold the sheet in shielding relation to the front face of the radiator grid, an imperforate pliant sheet adapted to fit against the front face of the foraminous sheet, and means for detachably securing the imperforate sheet against the front face of the foraminous sheet.

2. As an article of manufacture, a flexible radiator protector assembly adapted for removable association in overlying, conforming relation with the grid of a radiator, said assembly comprising a pliant, normally flat sheet of finely woven foraminous material adapted to be bent to conform to the frontal contour of a radiator grid, a plurality of fasteners carried by said sheet for detachably securing the sheet against a grid in shielding relation thereto, an imperforate sheet of pliant material adapted to fit flat against the front face of the foraminous sheet, and complementary fastener elements carried by confronting faces of said sheets for detachably engaging each other and removably securing the imperforate sheet against the foraminous sheet.

3. As an article of manufacture, a flexible radiator protector adapted for removable association with the grid of a radiator, said protector comprising a finely woven sheet of pliant foraminous material adapted to be bent to conform to the frontal contour of a radiator grid, a flexible binding for margins of said sheet extending about the sheet, fasteners carried by marginal portions of said sheet adjacent the binding in spaced relation to each other and projecting rearwardly from the sheet and adapted to detachably engage bars of the grid to removably secure the sheet in close fitting engagement with the front of the grid and in conforming relation to the contour thereof, and fastener elements carried by said sheet and adapted for detachable engagement with companion fastioner elements carried by an imperforate sheet whereby the imperforate sheet may be removably secured flat against the outer front face of the foraminous sheet.

4. The combination with a radiator housing formed with a radiator opening and grid members traversing said opening, of a sheet of pliant finely woven foraminous material conforming in outline with said opening, fasteners carried by marginal portions of said sheet and projecting rearwardly therefrom and adapted to detachably engage said grid members for supporting said sheet flat against the grid, a binding of flexible material for marginal portions of said sheet, an imperforate pliant sheet adapted to cover the outer front face of a portion of the foraminous sheet, and companion fastener elements carried by confronting faces of said sheets for detachably engaging each other and removably securing the imperforate sheet against the foraminous sheet.

VIRGIL L. LETT.